United States Patent
Ogami et al.

[11] Patent Number: 5,866,276
[45] Date of Patent: Feb. 2, 1999

[54] BATTERY STRUCTURE FOR ELECTRIC VEHICLE

[75] Inventors: Etsuo Ogami, Kanagawa-ken; Tatsuo Shimizu, Fukushima-ken; Yosuke Kita, Tokyo, all of Japan

[73] Assignee: Nissan Motor Co., Ltd., Yokohama, Japan

[21] Appl. No.: 720,297

[22] Filed: Sep. 27, 1996

[30] Foreign Application Priority Data

Sep. 27, 1995 [JP] Japan ................................ 7-249524

[51] Int. Cl.$^6$ .......................... H01M 2/10; H01M 10/50
[52] U.S. Cl. ........................ 429/120; 429/65; 429/148; 429/151; 429/159
[58] Field of Search ............................. 429/65, 120, 148, 429/151, 156, 159

[56] References Cited

U.S. PATENT DOCUMENTS

| | | | |
|---|---|---|---|
| 2,836,642 | 5/1958 | Bauer | 429/148 |
| 4,599,283 | 7/1986 | Thiele et al. | 429/159 X |
| 4,693,948 | 9/1987 | McEwan | 429/65 X |
| 5,585,205 | 12/1996 | Kohchi | 429/120 X |

FOREIGN PATENT DOCUMENTS

7-47892  2/1995  Japan .

Primary Examiner—Stephen Kalafut
Attorney, Agent, or Firm—Foley & Lardner

[57] ABSTRACT

A battery structure for an electric vehicle includes a plurality of columnar component cells and a substantially square battery casing for accommodating the component cell. The battery casing includes a casing body consisting of an upper casing, a lower casing and an intermediate casing interposed between the upper casing and the lower casing, and a pair of side covers fitted to both ends of the casing body. In the battery casing, a plurality of rib walls are formed to support the component cells and to divide an interior of the battery casing into a plurality of compartments in the longitudinal direction of the battery casing. Further, the battery casing has air holes formed in top and bottom walls of the battery casing for circulating cooling air in the compartments vertically. In operation, since the cooling air flows vertically through the upper and lower air holes in the respective compartments defined by the rib walls, it is possible to extend the cooling air over the whole lengths of the component cells, so that the cooling for the component cells can be effected to enhance the cooling capability of the whole batteries.

8 Claims, 7 Drawing Sheets

BATTERY STRUCTURE FOR ELECTRIC VEHICLE

BACKGROUND OF THE INVENTION

1. Field of the Invention

The present invention relates to a battery structure for an electric vehicle.

2. Discription of the Related Art

Conventionally, high performance batteries having lithium Ion etc. as a main constituent, have been employed as batteries for an electric vehicle. However, since these high performance batteries exhibit relatively high caloric value in use, it has been required to enhance the cooling performance of the batteries.

From this point of view, a variety of battery structures for improving the cooling performance are disclosed in Japanese Patent Publications. For example, in Japanese Patent Publication No. 7-47892. Cylindrical batteries are interposed between two plates made of a highly conductive thermal material which is vertically oriented, i.e., from the upside and downside. The so-assembled batteries are fixed on a vehicle body through the plates so as to define air passages therebetween. Consequently, with the motorcar traveling, cooling air is introduced into hollow parts of the batteries and the air passages between the plates.

Disadvantages of the known battery structure included heat is apt to be stagnant in the air passages because of their narrowness, and when the batteries are oriented in the back and forth, or longitudinal, direction of a vehicle, the batteries are subject to irregular cooling effect along their axial length.

Another disadvantage of the known battery structure is that the batteries interposed between the plates are easy to displace in the axial direction. Even a buffer member is provided between the plates and the batteries to solve the displacement problem, the draft cooling capability of the battery structure is adversely affected.

In addition to poor cooling performance, because known battery structure having cylindrical batteries interposed between the two plates is fixed on the vehicle by fastening the plates to members on the vehicle's side, detaching the batteries from the vehicle becomes difficult.

SUMMARY OF THE INVENTION

It is an object of the present invention to provide a battery structure for an electric vehicle, which exhibits superior cooling capability for the batteries and enables the battery structure to be fixed to the body of the electric vehicle securely. Moreover, it is possible to attach the batteries to the vehicle body and detach the batteries from the vehicle body easily.

The objects of the present invention described above can be accomplished by a battery structure for an electric vehicle, comprising:

a plurality of columnar component cells; and a substantially square battery casing for arranging the component cells therein horizontally, the battery casing having a plurality of rib walls formed therein to support the component cells and divide an interior of the battery casing into a plurality of compartments in the longitudinal direction of the battery casing;

wherein the battery casing is provided with air holes which are formed in top and bottom walls of the battery casing for circulating cooling air in the compartments vertically.

According to the above arrangement, since the plural columnar component cells are arranged sideways in the battery casing and supported by the plural rib walls, it is possible to neatly arrange and had the required number of component cells in the battery casing. Since the battery casing having the plural component cells accommodated therein is formed to be a parallel piped, such a configuration allows the battery casing to be easily securely mounted on a battery frame of the electric vehicle and removed therefrom easily, similar to a "conventional square battery" in which a plurality of rectangular component cells in the form of thin plates are gathered.

Since the cooling air flows vertically through the upper and lower air boles in respective compartments defined by the rib walls, it is possible to provide cooling air over the whole lengths of the component cells, so that substantially uniform cooling for the component cells can be effected to enhance the cooling capability of the whole battery unit.

Since the battery casing has the plural rib walls formed integrally therewith, it is also possible to enhance the rigidity of the battery casing.

According to a preferred embodiment of the present invention, each of the rib walls is provided with grooves which are formed on a periphery of the rib wall which abuts the component cells. A sealant serves to seal the peripheries of the rib walls and the peripheries of the component cells, thereby preventing communication of cooling air between adjacent compartments so as to improve the vertical flow of cooling air in each compartment, and further improve the cooling capability. In addition, the sealant may adhere the rib walls to the outer peripheries of the component cells, fixing them to the battery casing securely.

Preferably, the battery casing further includes reinforcement ribs which project between adjacent component cells and connect adjacent rib walls to one another.

Owing to the arrangement where the adjoining rib walls are connected with each other through the reinforcement ribs, rigidity of the battery casing is enhanced. Moreover, since the reinforcement ribs project between adjoining component cells, cooling air flowing from the bottom of the battery casing is guided by the reinforcement ribs to flow around the peripheries of the component cells, and the cooling capability for the component cells is further enhanced.

In one embodiment, all of the reinforcement ribs except for the reinforcement ribs project from inner walls of the battery casing have plus-shaped cross-section.

According to the present invention, it is preferable that, among the compartments on the sides of the battery casing in which projecting terminals of the component cells are disposed, are completely enclosed and that a pair of outer terminals project outward from at least one of the two compartments, penetrating an upper wall of the compartment.

Because of the closed structure of the compartments on the sides of the battery casing, dust and mist can be excluded from the electrical contacts for the projecting terminals, so that excellent battery performance can be maintained.

Because the pair of outer terminals project outwardly while penetrating the upper wall of the compartment on one side of the battery casing, the connecting harness for electrically connecting the plural battery casings with each other can be simplified and shortened.

Preferably, the wall of the compartment through which the outer terminals project has a pair of protectors formed thereon partially surrounding the outer terminals. Consequently, it is possible to prevent a worker from directly touching the outer terminals by mistake, thereby improving safety during handling at the battery casing.

In another preferred embodiment the battery casing comprises:

a casing body consisting of an upper casing, a lower casing and an intermediate casing interposed between the upper casing and the lower casing; and a pair of side covers fitted to both ends of the casing body.

Because the structure can be separated, it is possible for a worker to assemble and connect the component cells easily.

The upper casing may be provided on respective side corners thereof with a plurality of brackets, while the lower casing may be provided on respective side corners thereof with a plurality of seats for engagement with the electrical vehicle.

The above and other features and advantages of this invention will become apparent, and the invention itself will best be understood, from a study of the following description and appended claims, with reference had to the attached drawings showing a preferred embodiment of the invention.

DESCRIPTION OF THE PREFERRED EMBODIMENT

FIGS. 1–5 show one embodiment of the present invention in which, reference numeral 1 designates a high performance component cell containing a main constituent such as lithium ion, and which is covered with a casing exhibiting high thermal conductivity.

Terminals 2 project from both ends of the elongated component cell 1, which is shaped to be columnar in order to ensure pressure tightness even when it expands due to generating heat.

Reference numeral 4 denotes a battery casing in which a plurality of component cells 1 arranged horizontally and accommodated on multiple levels vertically. The battery casing 4 may be made of appropriate synthetic materials, and shaped to be substantially parallel piped or square.

Four component cells 1 are shown disposed horizontally on each level in the battery casing 4. Bus bars 3 connect the terminals 2 of the component cells 1 with each other in series.

The battery casing 4 enclosing the plural component cells 1 has a plurality of rib walls 5 formed integrally therewith. The rib walls 5 serve to divide an interior of the casing 4 into a plurality of compartments 6 along in the longitudinal direction of the component cells 1.

The battery casing 4 of the embodiment is composed of a casing body 7 and two side covers 8, 9 fitted to opposite ends of the casing body 7.

The casing body 7 comprises a lower casing 7A having rib walls 5a integrally formed therewith to support respective lower half portions of the component cells 1 on the lower level, an upper casing 7B having rib walls 5b integrally formed therewith to support respective upper half portions of the component cells 1 on the upper level, and an intermediate casing 7C having rib walls 3c integrally formed therewith to support the upper half portions of the component cells 1 on the lower level and the lower half portions of the component cells 1 on the upper level.

Figure 6:
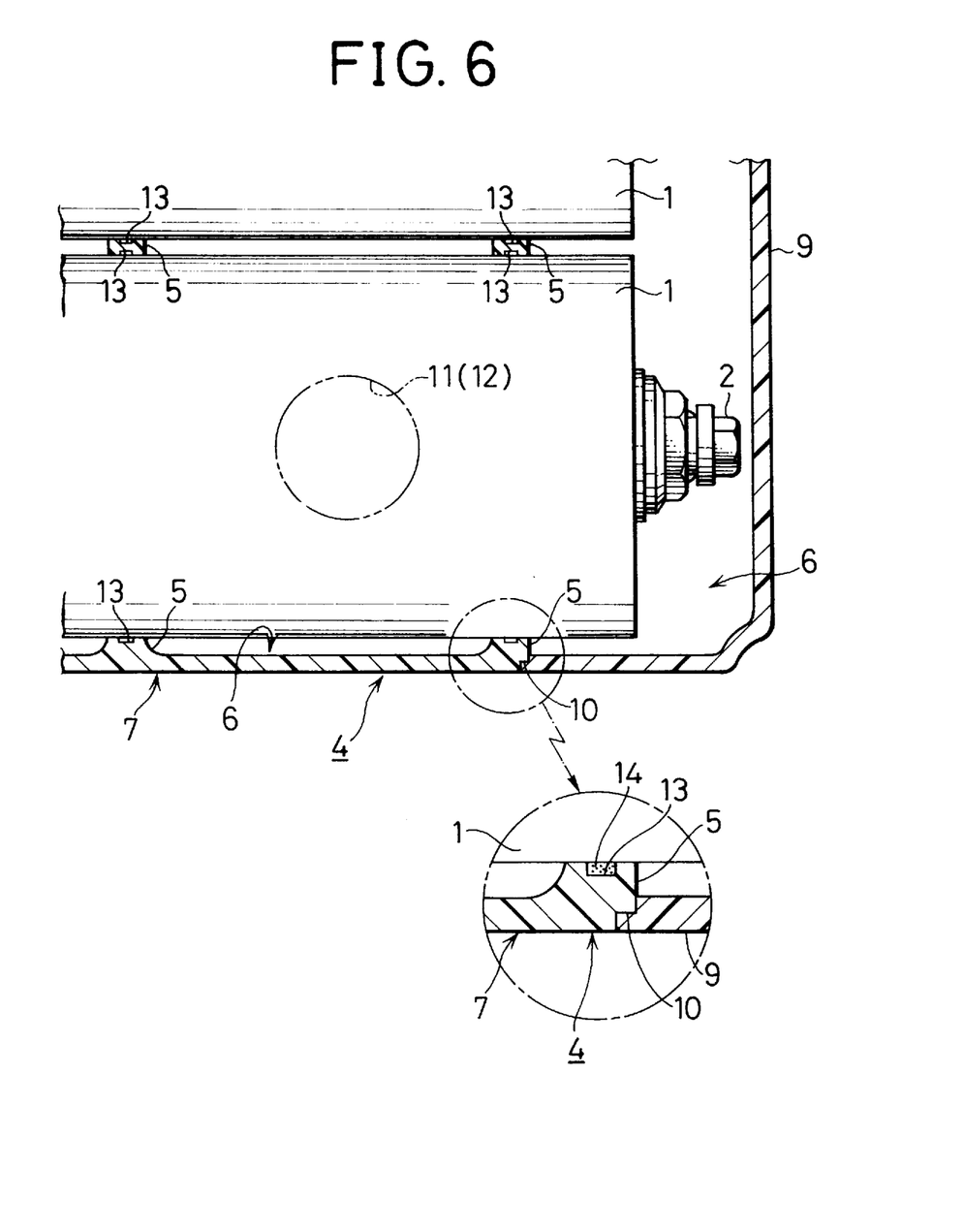
FIG. 6 is a cross sectional view illustrating a connecting condition between a casing body and a side cover of the battery structure.

At respective engaging portions between the casing body 7 and the side covers 8, 9 and at engaging portions among the lower casing 7A, the intermediate casing 7C and the upper casing 7B, the battery casing 4 has stepped parts 10 formed to cooperatively engage with each other. During assembly, the mutual engagement of the stepped parts 10 facilities adhering the casings 7A, 73, 7C together and also adhering the resulting casing body 7 to the side covers 8, 9.

Figure 1:
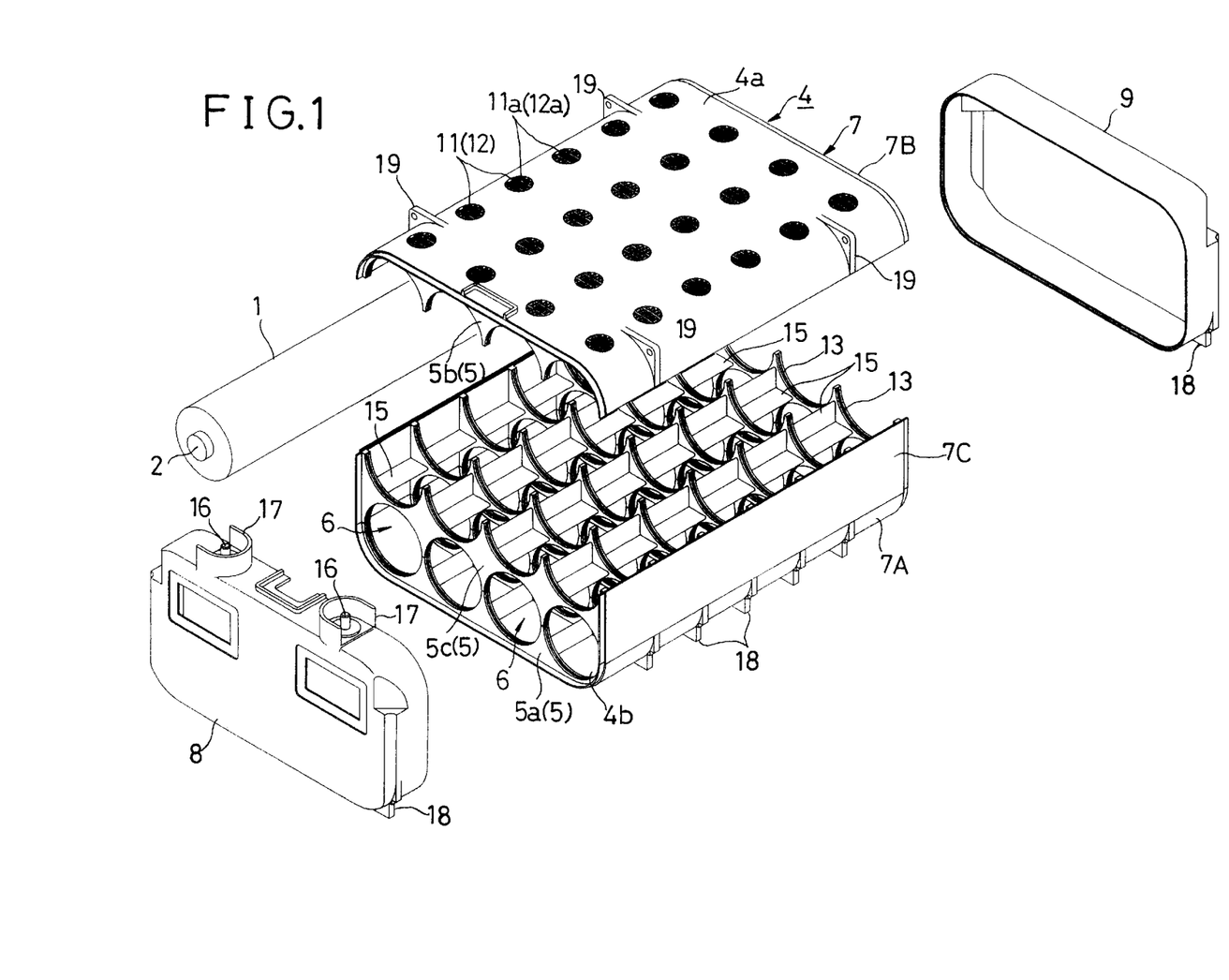
FIG. 1 is a perspective view of an exploded battery structure in accordance with an embodiment of the present invention.
Figure 2:
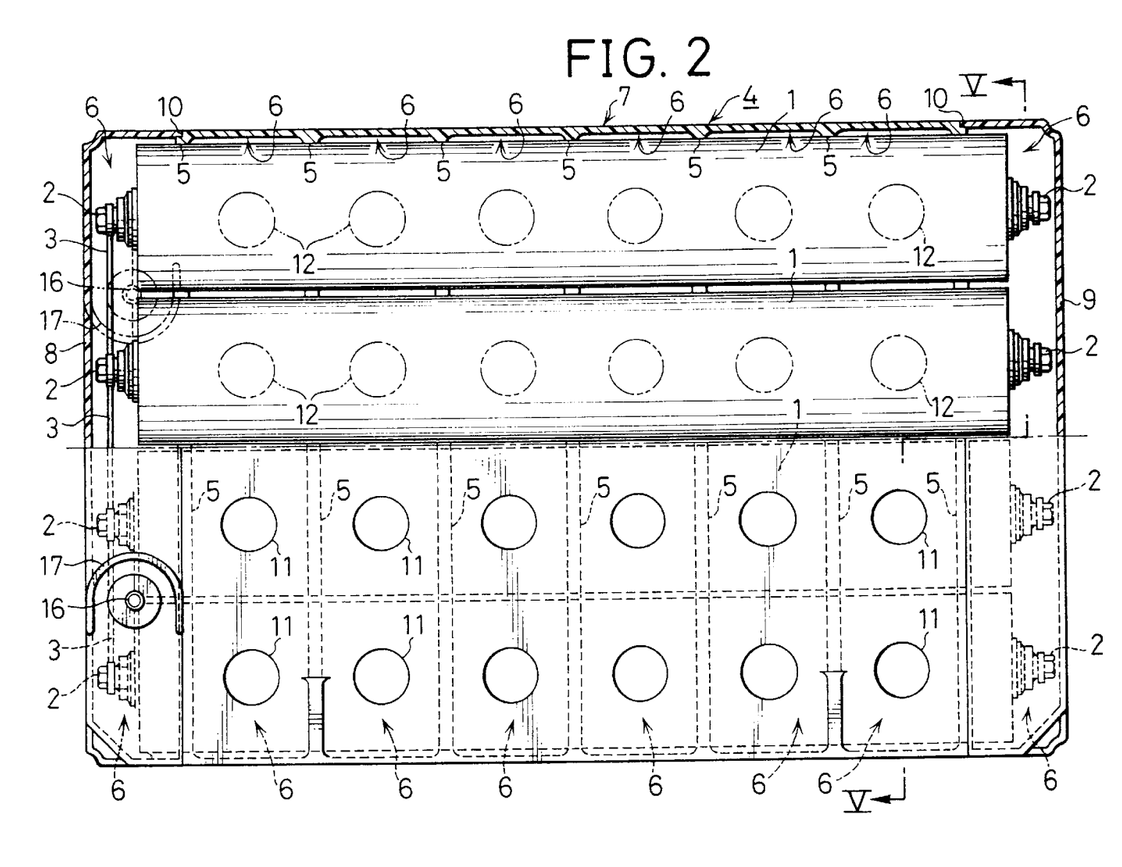
FIG. 2 is a plan view of the assembled battery structure of FIG. 1, showing a half part thereof in section.
Figure 3:
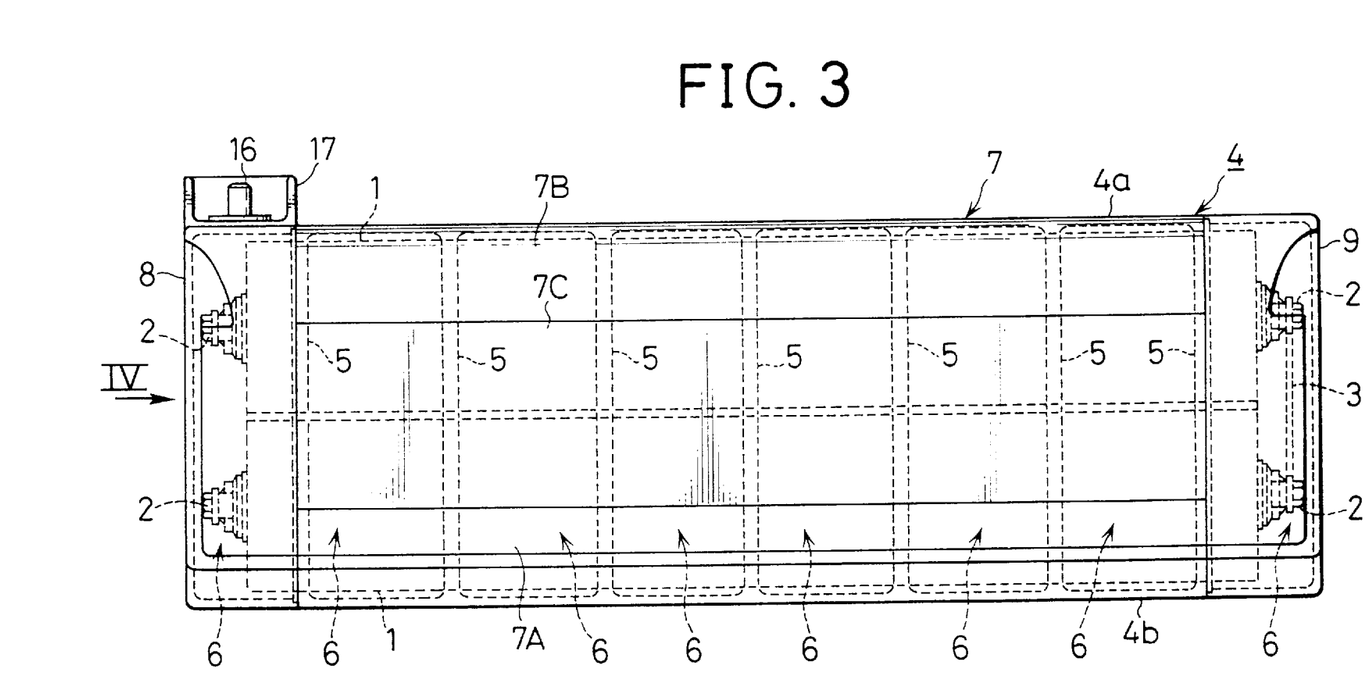
FIG. 3 is a side view of FIG. 2.
Figure 4:
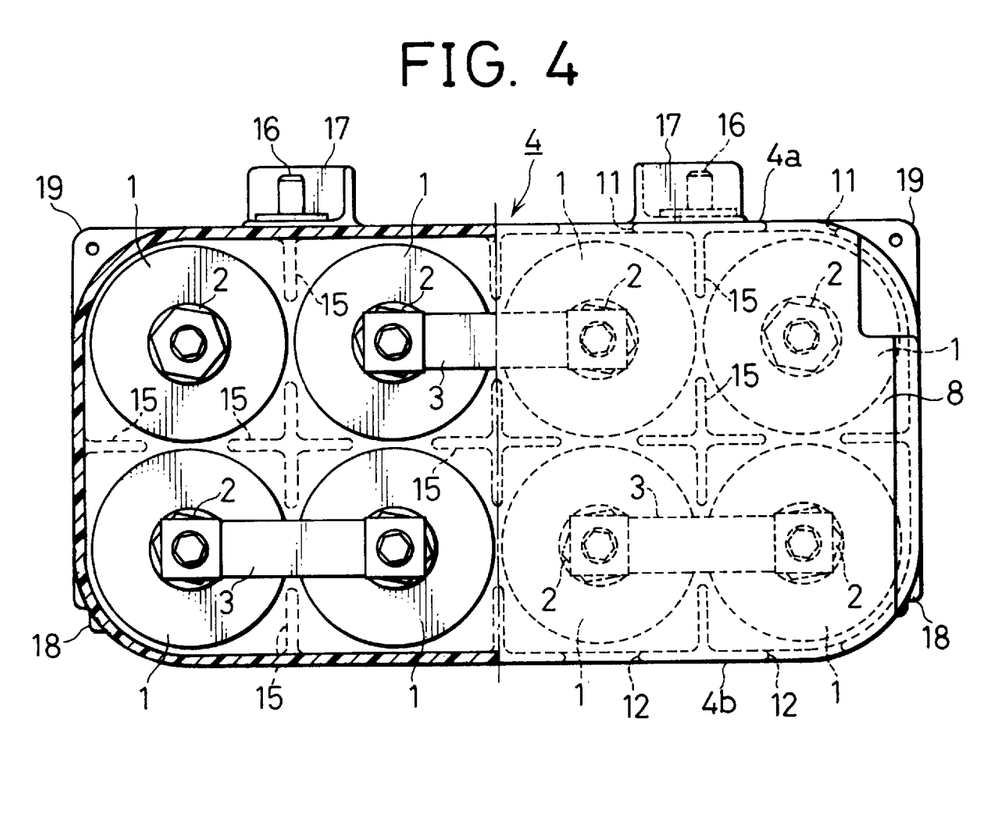
FIG. 4 is a side view of the battery structure in a direction of IV of FIG. 3, showing a half part thereof in section.
Figure 5:
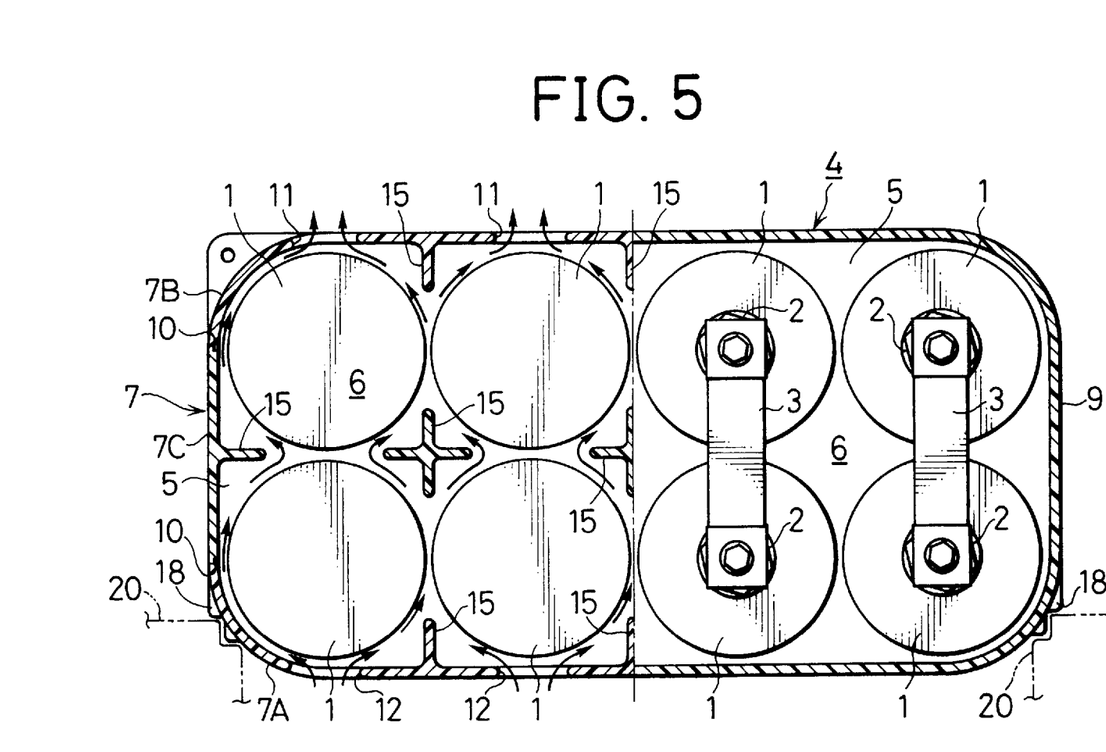
FIG. 5 is a cross sectional view of the battery structure, taken along a line of V—V of FIG. 2.

The battery casing 4 is provided with a plurality of air holes 11, 12 formed on upper and lower wall 4a, 4b of the casing body 7 to introduce vertical cooling air into the compartments 6 defined by the rib walls 5 of the casing 4.

Integral with the air holes 11, 12 are respective louvers 11a, 12a provided to prevent alien substances from entering into the battery casing 4.

Each of the rib walls 5 has grooves 13 formed in the edges circumferentially abutting the component cells 1. The grooves 13 are filled with a sealant 14 to insulate the neighboring compartments 6, 6 from each other.

By supplying the sealant 14 in the grooves 13, it is possible to seal the compartments 6, 6 positioned on both ends of the battery casing 4 and which are defined by the rib walls 5 on both ends of the casing body 7 and the side covers 8, 9 accommodating the terminals 2 of the component cell 1 therein.

Adjacent rib walls 5, 5 are associated with each other through reinforcement ribs 15 which project between adjoining component cells 1, 1. Some reinforcement ribs 15 have a plus-shaped cross-section which projects four directions into clearances between four adjoining component cells 1, 1, 1, 1 arranged about the rib 15.

A pair of outer terminals 16, 16 are arranged to penetrate a top wall of the side cover 8 and project outward. The pair of outer terminals 16, 16 are electrically connected to the positive and negative bus-bars 3, 3 of the battery, respectively. Further, on the top wall of the side cover 8, a pair of protectors 17, 17 are integrally formed to partially surround each of the outer terminals 16, 16, respectively. Each protector 17 is formed to have U-shaped cross section, and is positioned in such a manner that respective bight portions of the 6-configurations are opposite to each other. This arrangement of the protectors 17, 17 make it possible to connect a harness (not-shown) to the outer terminals 16, 18, through the openings of the U-configurations oriented in the opposite directions to each other.

A plurality of seats 18 are formed integrally with the lower casing 7A on respective side corners thereof. Theses seats 18 are provided for engagement with a battery frame 20 (see FIG. 7) on which plural battery casings 4 are to be mounted.

Formed integrally with the upper casing 7B on the side corners thereof are a plurality of brackets 19 which serve to mount the battery casing 4 when it is attached to the battery frame 20.

Figure 7:
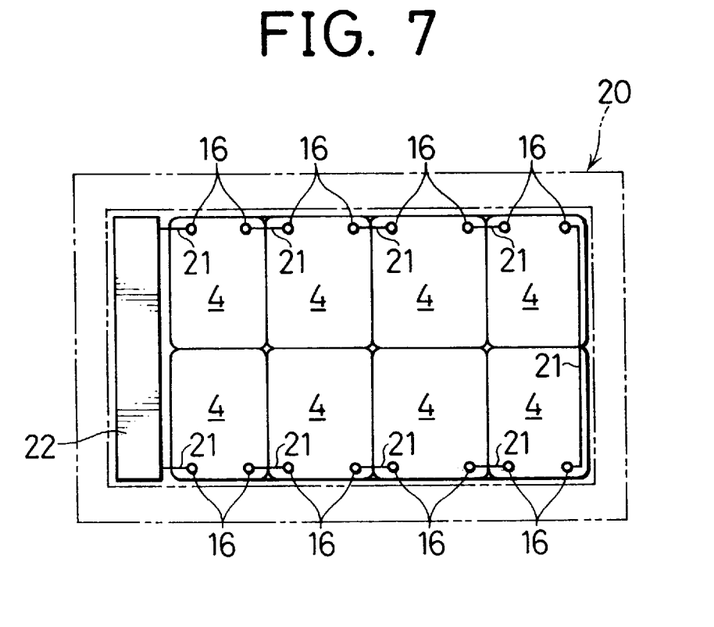
FIG. 7 is an explanatory plan view showing an example of mounting a battery casing of the battery structure on a vehicle body.

According to the battery structure of the embodiment, the plural battery cases 4 having the plural columnar component cells 1, 1 . . . accommodated therein are mounted on the battery frame 20 of a vehicle. Cooling air is introduced into the bottom of the battery frame 20 by baffle means (not shown). Since the respective compartments 6, 6 defined by the rib walls 5, 5 in the longitudinal direction of the battery casing 4 communicate with the outside through the air holes 11, 12 formed in the upper and lower walls 4a, 4b of the battery casing 4, the cooling air from the battery frame 20 is introduced into the respective compartments 6, 6 through the lower air holes 12, 12 and discharged to the outside through the upper air holes 11, 11, as shown with arrows of FIG. 5.

Consequently, cooling air is provided over the whole length of the component cells 1, 1 . . . accommodated in the upper and lower levels of the battery casing 4, so that the cooling for the component cell 1, 1 . . . enhances the cooling capability of the whole battery consisting of the component cells 1, 1 . . . and the battery casing 4. Since clearances between the peripheries of the rib walls 5, 5 and the component cells 1, 1 . . . are sealed by the sealant 14 to exclude communication of cooling air between adjacent compartments 6, 6, the flow of cooling air in each compartment 6 is improved in the vertical directions. Moreover, since the reinforcement ribs 15, 15 connecting the adjoining rib walls 5, 5 with each other are formed so as to project between the adjoining component cells 1, 1, the cooling air flowing from the bottom of the battery casing 4 is guided by the reinforcement ribs 15, 15 to flow around the peripheries of the component cells 1, 1 thereby further enhances the cooling capability for the component cells 1, 1.

On both sides of the battery casing 4, the compartments 6, 6 in which the terminals 2, 2 . . . of the component cells 1, 1 are disposed are completely sealed by the rib walls 5, 5 at the ends of the casing body 7 and the sealant 14 in the peripheral grooves 13, 13. Such a sealed structure between the respective side covers 8, 9 and the rib walls 5, 5, makes it is possible to exclude the adhesion of dust and mist onto electrical contacts on the projecting terminals 2, 2 . . . , so that the battery performance can be maintained.

Apart from the improved cooling capability, the sideways arrangement of plural columnar component cells 1, 1 . . . of the embodiment are arranged sideways in the battery casing 4 and the support by the plural rib walls 5, 5 . . . in a multi-level manner makes it possible to neatly arrange the required number of component cells 1, 1 . . . without movement in the battery casing 4. Since each of the rib walls 5, 5 . . . has grooves 13 formed on the periphery abutting the peripheries of the component cells 1, 1 . . . which are filled with the sealant 14, the rib walls 5, 5 . . . may be adhered on the outer peripheries of the component cells 1, 1 . . . , thereby securely fixing them with respect to the battery casing 4.

Since the battery casing 4 having the component cells 1, 1 . . . accommodated therein has a substantially parallel piped, configuration, the battery casing 4 can be easily mounted securely on the battery frame 20 of the electric vehicle and removed therefrom easily.

Furthermore, rigidity of the battery casing 4 is enhanced by the plural rib walls 5, . . . formed integrally therewith and the adjoining rib walls 5,5 are connected by the reinforcement ribs 15, 15 . . .

The battery casing 4 of the embodiment is composed of the casing body 7 and the side covers 8, 9 fitted to both ends of the casing body 7. The casing body 7 Is composed of the lower casing 7A, the intermediate casing 7B and the upper casing 7C. The battery casing 4 is assembled by first mounting the component cells 1, 1 . . . on the rib walls 5a, 5a . . . of the lower casing 7A, then laying the intermediate casing 7C on the lower casing 7A, then mounting the upper component cells 1, 1 . . . on the rib walls 5a, 5a . . . of the intermediate casing 7C, then laying the upper casing 7B on the intermediate casing 7C, and finally engaging and fixing the casings 7A, 7B, 7C with respect to each other, thereby making it possible to easily assemble the plural component cells 1, 1 . . . sideways in the casing body 7 in a multiple layer manner. Further, according to the embodiment, the side covers 8, 9 are disengaged from the battery casing 4, the terminals 2, 2 . . . of the component cells 1, 1 . . . can be electrically connected in series with each other by bus bars 3, 3 . . . in series and the bus bars 3, 3 . . . can be electrically connected with the outer terminals 16, 16. Thus, It is possible for a worker to easily assemble and connect work of the component cells 1, 1 . . . easily.

In use, a plurality of battery casings 4, 4 . . . having a plural of component cells 1, 1 . . . accommodated therein, are mounted on the battery frame 20 and electrically connected with each other in series. Then, for example, as shown in FIG. 7, the plural battery casings 4,4 . . . may be arranged in two lines so as to align the outer terminals 16, 16 along the sides of the battery frame 20 and to connect the outer terminal 16 of each adjacent battery casing 4 with a harness 21 which also connects the outer terminal 16 of one battery casing 4 with a junction box 22 in series. This makes it possible to simplify and shorten the harness circuit while facilitating the connection of the harnesses.

Further, since each battery casing 4 has the protectors 17, 17 formed integrally with the upper wall 16 to partially surround the projecting part of the outer terminals 16, 16, it is possible to prevent a worker from directly touching both outer terminals 16, 16 by mistake, thereby improving safety during handling of the battery casing 4.

It is noted that although the invention has been described with reference to the battery casing 4 where the component cells 1, 1 . . . are arranged on two upper and lower levels, the component cells 1, 1 . . . may be assembled in the battery casing 4 on three or more levels by using plural intermediate casings 7C. It will be understood that, in such a case, the side covers 8, 9 would be enlarge to correspond with the increased size of the casing body 7 increased.

Finally, it will be understood by those skilled in the art that the foregoing description is preferred embodiments of the disclosed battery structure, and that various changes and modifications may be made to the present invention without departing from the spirit and scope thereof.

What is claimed is:

1. A battery structure for an electric vehicle, comprising:
   a plurality of columnar component cells; and
   a substantially parallel piped battery casing for arranging said component cells therein horizontally, said battery casing having a plurality of rib walls formed therein to support said component cells and divide an interior of said battery casing into a plurality of compartments in the axial direction of said component cells;
   wherein said battery casing is provided with air holes which are formed in top and bottom walls of said battery casing for circulating cooling air in said compartments vertically.

2. A battery structure as claimed in claim 1, wherein each of said rib walls includes grooves confronting on said component cells and which are filled with sealant.

3. A battery structure as claimed in claim 2, wherein said battery casing further includes reinforcement ribs projecting between adjacent ones of said component cells and connecting adjacent ones of said rib walls with each other.

4. A battery structure as claimed in claim 3, wherein each of said reinforcement ribs projecting between four mutually adjacent ones of said component cells have a plus-shaped cross-section.

5. A battery structure as claimed in claim 1, wherein, a compartment on at least one side of said battery casing in which projecting terminals of said component cells are disposed is completely enclosed, and at least one outer terminal penetrates a wall defining said at least one compartment and projects outward from said at least one compartment.

6. A battery structure as claimed in claim 5, wherein said wall of said compartment includes a protector formed integrally therewith and partially surrounding said at least one outer terminal.

7. A battery structure as claimed in claim 1, wherein said battery casing comprises:

a casing body consisting of an upper casing, a lower casing and an intermediate casing interposed between said upper casing and said lower casing; and a pair of side covers fitted to both ends of said casing body.

8. A battery structure as claimed in claim 7, wherein said upper casing includes a plurality of brackets on respective side edges thereof, said lower casing includes a plurality of seats for engaging said electric vehicle, said plurality of seats are on respective side edges of said lower casing.

* * * * *